(12) United States Patent
Morin et al.

(10) Patent No.: US 10,986,809 B2
(45) Date of Patent: Apr. 27, 2021

(54) APPARATUS FOR PREPARING FEED FOR ANIMALS

(71) Applicant: SEB S.A., Ecully (FR)

(72) Inventors: Gilles Morin, Varois et Chaignot (FR); Annabelle Goyon, Marcilly-sur-Tille (FR)

(73) Assignee: SEB S.A.

( * ) Notice: Subject to any disclaimer, the term of this patent is extended or adjusted under 35 U.S.C. 154(b) by 396 days.

(21) Appl. No.: 16/061,578

(22) PCT Filed: Dec. 15, 2016

(86) PCT No.: PCT/FR2016/053476
§ 371 (c)(1),
(2) Date: Jun. 12, 2018

(87) PCT Pub. No.: WO2017/103507
PCT Pub. Date: Jun. 22, 2017

(65) Prior Publication Data
US 2018/0368358 A1 Dec. 27, 2018

(30) Foreign Application Priority Data
Dec. 16, 2015 (FR) ...................................... 1562559

(51) Int. Cl.
*A01K 5/02* (2006.01)
*A01K 5/01* (2006.01)
*A01K 5/00* (2006.01)

(52) U.S. Cl.
CPC ............ *A01K 5/0216* (2013.01); *A01K 5/001* (2013.01); *A01K 5/0114* (2013.01); *A01K 5/0275* (2013.01)

(58) Field of Classification Search
CPC .... A01K 5/0216; A01K 5/001; A01K 5/0275; A01K 5/0114; A01K 5/002; A01K 5/0233; A01K 5/02; A01K 7/02; A01K 7/025
See application file for complete search history.

(56) References Cited

U.S. PATENT DOCUMENTS

| 3,547,081 A | 12/1970 | Geerlings |
| 3,920,224 A | 11/1975 | Fassauer |
| (Continued) | | |

FOREIGN PATENT DOCUMENTS

FR 2 386 271 A1 11/1978

OTHER PUBLICATIONS

International Search Report as issued in International Patent Application No. PCT/FR2016/053476, dated Mar. 21, 2017.

*Primary Examiner* — Trinh T Nguyen
(74) *Attorney, Agent, or Firm* — Lerner, David, Littenberg, Krumholz & Mentlik, LLP

(57) ABSTRACT

An apparatus for preparing feed for animals, includes a first container for storing at least one liquid; a second container for storing at least one dehydrated feed; a mixing chamber; a first dosing system configured to dose and transfer a first predetermined amount of the at least one liquid to the mixing chamber; a second dosing system configured to dose and transfer a second predetermined amount of the at least one dehydrated feed to the mixing chamber; a mixer, arranged at least temporarily in the mixing chamber, for stirring and mixing the at least one liquid with the at least one dehydrated feed during a mixing phase, so as to form a feed ration in paste form; and a dispenser, arranged to dispense the feed ration in paste form from the mixing chamber into a container, for dispensing during a dispensing phase.

16 Claims, 2 Drawing Sheets

(56) References Cited

U.S. PATENT DOCUMENTS

| | | | | |
|---|---|---|---|---|
| 4,513,688 A | * | 4/1985 | Fassauer | A01K 5/0291 |
| | | | | 119/57.1 |
| 4,665,862 A | | 5/1987 | Pitchford | |
| 4,815,042 A | * | 3/1989 | Pratt | A01K 5/0216 |
| | | | | 141/104 |
| 5,358,145 A | * | 10/1994 | Smith | A01K 5/02 |
| | | | | 222/135 |
| 8,511,519 B2 | | 8/2013 | Mahle et al. | |
| 2005/0217591 A1 | * | 10/2005 | Turner | A01K 5/02 |
| | | | | 119/51.02 |
| 2007/0280041 A1 | * | 12/2007 | Adent | A23K 20/00 |
| | | | | 366/183.1 |
| 2009/0173282 A1 | | 7/2009 | Wu et al. | |
| 2010/0239708 A1 | * | 9/2010 | Bachman | A01K 5/00 |
| | | | | 426/2 |
| 2011/0192213 A1 | * | 8/2011 | Zimmerman | A01K 5/02 |
| | | | | 73/23.3 |
| 2015/0302241 A1 | * | 10/2015 | Eineren | A01J 5/007 |
| | | | | 382/110 |
| 2017/0354119 A1 | * | 12/2017 | Dewey | A01K 7/027 |

* cited by examiner

APPARATUS FOR PREPARING FEED FOR ANIMALS

CROSS-REFERENCE TO RELATED APPLICATIONS

This application is the U.S. National Stage of PCT/FR2016/053476 filed Dec. 15, 2016, which in turn claims priority to French patent application number 1562559 filed Dec. 16, 2015. The content of these applications are incorporated herein by reference in their entireties.

This invention concerns in general a domestic apparatus for preparing feed for animals.

Devices for preparing feed for domestic animals are known in the prior art, such as the one described in the document U.S. Pat. No. 8,511,519B2, for example. In particular, this system has the disadvantage of offering feed only in solid form, which may not be suitable for certain animals.

One goal of this invention is to respond to the disadvantages of the aforementioned prior art document and in particular, first, to propose an apparatus for preparing feed for domestic animals that is adapted to prepare an appetizing feed ration.

For this purpose, a first aspect of the invention concerns an apparatus for preparing feed for animals comprising:
  means for storing at least one liquid,
  means for storing at least one dehydrated feed,
  a mixing chamber,
  means for dosing and transferring a first predetermined amount of said at least one liquid to the mixing chamber,
  means for dosing and transferring a second predetermined amount of said at least one dehydrated feed to the mixing chamber,
  mixing means, arranged at least temporarily in the mixing chamber, for stirring and mixing said at least one liquid with said at least one dehydrated feed during a mixing phase, so as to form a feed ration in paste form,
  dispensing means, arranged to dispense the feed ration in paste form from the mixing chamber into a container, during a dispensing phase. The apparatus according to this invention is arranged to prepare automatically, from basic ingredients (including at least one dehydrated feed and at least one liquid, such as water) a feed ration in paste form, which is more appetizing for animals than dry feed, such as kibble. The dehydrated feed may be in the form of powder, granules, flakes or kibble.

The apparatus is thus arranged to dispense a paste, and typically, the consistency of such a paste is pasty, but not liquid (even compared to honey or molasses, which eventually spread). For example, if a sample of the prepared paste is placed in a polycarbonate or glass cylinder 50 mm in diameter and 50 mm in height, in order to fill it, and a stainless steel probe 30 mm in diameter is driven in at a speed of 1 mm·s$^{-1}$, a force of at least 5 N must be applied. In other words, the prepared feed ration is not in liquid form and can remain in a three-dimensional form without flowing out when the paste is dispensed in the container.

It is understood that using the apparatus according to the invention, it is easy to prepare a feed ration "on demand" and without prior handling. In fact, when the storing means for the liquid and the dehydrated feed are full, the feed ration can be provided simply by starting up the machine. It is possible to provide for sufficient storage volumes for liquid and dehydrated feed to prepare a week's worth of food. For example, 6 liters of water and 2 kg of dehydrated feed could be stored.

Another advantage of the apparatus is that it can hold dehydrated feed, and the user can then choose the most suitable dehydrated feed for the animal.

Advantageously, the apparatus for preparing feed for animals comprises at least one part that is mobile in relation to the mixing chamber, and
  arranged to be driven in a mixing movement during the feed ration mixing phase, in order to be used as mixing means,
  arranged to be driven in a discharge movement during the dispensing phase, in order to be used as dispensing means,
and at least one component of the discharge movement is in the opposite direction of a component of the mixing movement. The mobile part is used to mix the liquid and the dehydrated feed and then to dispense the prepared paste: this produces an economy of means, and simplifies the apparatus, since the same member performs two different functions in a preparation cycle.

Advantageously, the apparatus for preparing feed for animals comprises at least one part that is mobile in rotation in relation to the mixing chamber, and arranged to be driven in rotation in a mixing movement during the feed ration mixing phase in order to be used as mixing means,
and said at least one mobile part is arranged to be driven in rotation in a discharge movement in the opposite direction of the mixing movement, during the feed ration dispensing phase, in order to be used as dispensing means. The mobile part is used to mix the liquid and the dehydrated feed and then to dispense the prepared paste: this produces an economy of means, and simplifies the apparatus, since the same member performs two different functions in a preparation cycle.

Advantageously, the mixing chamber, and/or the container, and/or the mixing means, and/or the dispensing means are removable from the apparatus. In this way, it is easy to disassemble and clean the apparatus.

Advantageously, said at least one mobile part comprises a hub, at least one paddle and at least one branch connecting said at least one paddle to the hub, said at least one paddle comprises at least:
  a first leading edge arranged to mix said at least one liquid with said at least one dehydrated feed during the mixing movement,
  a second leading edge arranged to push the paste toward the periphery of the mobile part during the discharge movement. The first leading edge may be oriented to return the mixture to the inside of the mixing chamber, that is, to induce feed movement with at least one centripetal component. In other words, the paddle's first leading edge can form a blade with an edge or bevel oriented toward the inside of the mixing chamber. In addition, the second leading edge may be oriented to push the mixture toward the outside of the mixing chamber, that is, to induce feed movement with at least one centripetal component. In other words, the paddle's second leading edge can form a blade with an edge or bevel oriented toward the outside of the mixing chamber.

Advantageously, said at least one branch comprises at least:
  a first front face arranged to scrape the mixing chamber during the mixing movement and forming a point at a junction with said at least one paddle, a second front face arranged to scrape the mixing chamber during the discharge movement and forming a rounded trailing edge at a junction with said at least one paddle. The point formed between the branch's first front face and the paddle is arranged to return the mixture to the inside of the mixing chamber, while the rounded trailing edge formed between the branch's second front face and the paddle is arranged to push the mixture toward the outside of the mixing chamber.

Advantageously, the apparatus for preparing feed for animals comprises a device for opening a dispensing opening of the mixing chamber, and a mechanism for unlocking the opening device is provided, controlled by said at least one mobile part, or a drive member of the latter, when it is put into discharge movement. In other words, the apparatus comprises a driving mechanism arranged to drive the mixing means in the mixing movement, and doing so, keeps the dispensing opening closed. As soon as the driving mechanism changes its drive direction (to drive the dispensing means in the dispensing movement opposite the mixing movement), this unlocks the device for opening the dispensing opening.

Advantageously, the storing means of said at least one liquid form a base arranged to support the apparatus for preparing feed for animals and the container in which the feed ration is dispensed. This implementation permits raising the apparatus and in particular the container for the comfort of the animal, who will not have to lower its head to the floor in order to eat.

Advantageously, the means for dosing and transferring a first predetermined amount of said at least one liquid to the mixing chamber are arranged to leave a predetermined volume of liquid in the means for storing said at least one liquid. Keeping such a volume of water constantly below the apparatus ballasts it and in this way stabilizes the apparatus. Feet with non-slip pads could also be provided.

Advantageously, the means for dosing and transferring a first predetermined amount of said at least one liquid to the mixing chamber comprise a nozzle for suction of liquid, arranged at a predetermined distance from the bottom of the means for storing said at least one liquid.

Advantageously, the means for dosing and transferring a second predetermined amount of said at least one dehydrated feed comprise at least one worm screw coupled to a motor. Such a worm screw makes it possible to dose the dehydrated feed precisely, by controlling its rotation speed and time of operation.

Advantageously, the apparatus for preparing feed for animals comprises means for storing at least one feed additive, and means for dispensing in the mixing chamber a third predetermined amount of said at least one additive. With such an additive, the preparation can be adjusted according to the animal's age, weight, state of health, etc.

Advantageously, the apparatus for preparing feed for animals comprises at least one unit for acquisition of biological and/or physiological data on an animal to be fed. This makes it possible to adjust and personalize the preparation according to the user's animal.

Advantageously, the acquisition unit is arranged to receive the biological and/or physiological data wirelessly, for example by radio wave or infrared. It could be envisioned that the acquisition unit would be able to establish a communication with a portable electronic device such as a telephone or smartphone, or a scale, by radio frequency (wifi or Bluetooth®). It is then possible to form a system to monitor the animal's health, with adjustment of the feed ration (weight, composition) according to the information received.

The biological and/or physiological data may, for example, include the weight, height, breed, type of animal, its age, state of health, sex, and whether it is a pregnant female. This makes it possible to adjust and personalize the preparation according to the user's animal.

Advantageously, the apparatus for preparing feed for animals comprises at least one control unit arranged to control the means for dosing and transferring a first predetermined amount of said at least one liquid, and/or the means for dosing and transferring a second amount of said at least one dehydrated feed, according to the animal's biological and/or physiological data. It is also possible to anticipate having the apparatus operate at specific moments in the day, without the user's manual intervention.

Other characteristics and advantages of this invention will be seen more clearly by reading the following detailed description of an embodiment of the invention, provided as a non-restrictive example, and illustrated by the attached drawings in which.

Figure 1:
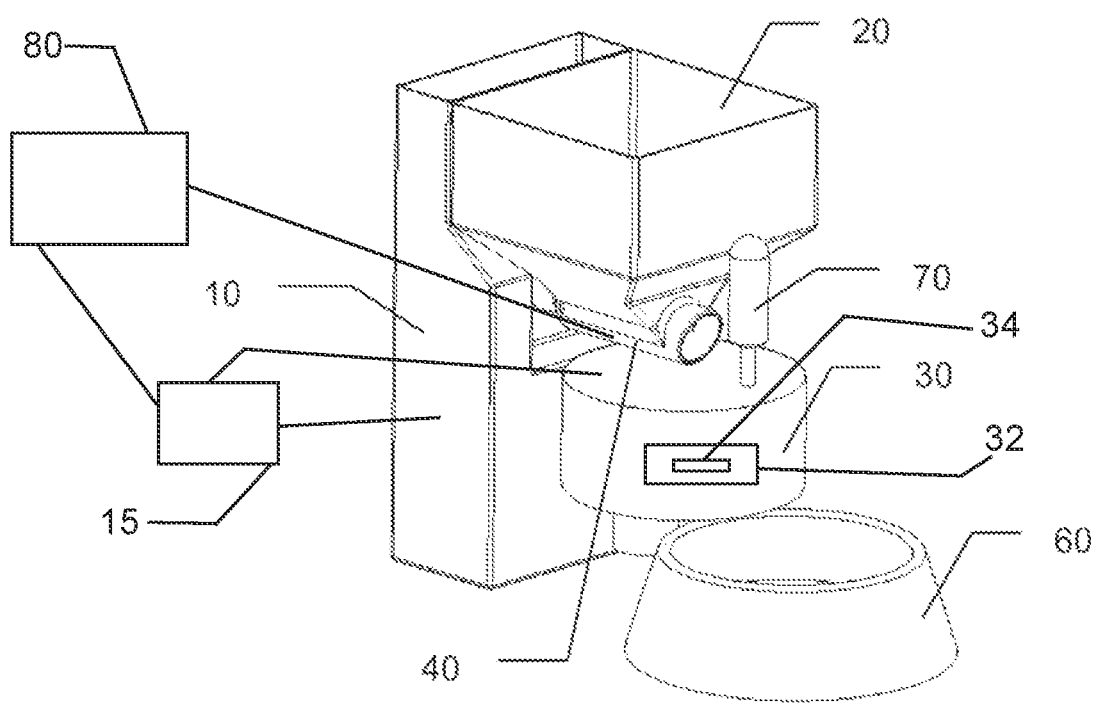
FIG. 1 is a perspective view of an apparatus according to this invention.

FIG. 1 shows an apparatus for preparing feed for animals, comprising means for storing at least one liquid, in the form of a container 10, means for storing at least one dehydrated feed in the form of a hopper 20, a mixing chamber 30, means for dosing and transferring a second predetermined amount of said at least one dehydrated feed to the mixing chamber in the form of a worm screw 40, a container 60 for holding a feed ration prepared by the apparatus. The mixing chamber 30 includes a device 32 for opening a dispensing opening of the mixing chamber and a mechanism 34 for unlocking the opening device. The apparatus further includes a unit 80 for acquisition of biological and/or physiological data and a nozzle 15 for suction.

Figure 3:
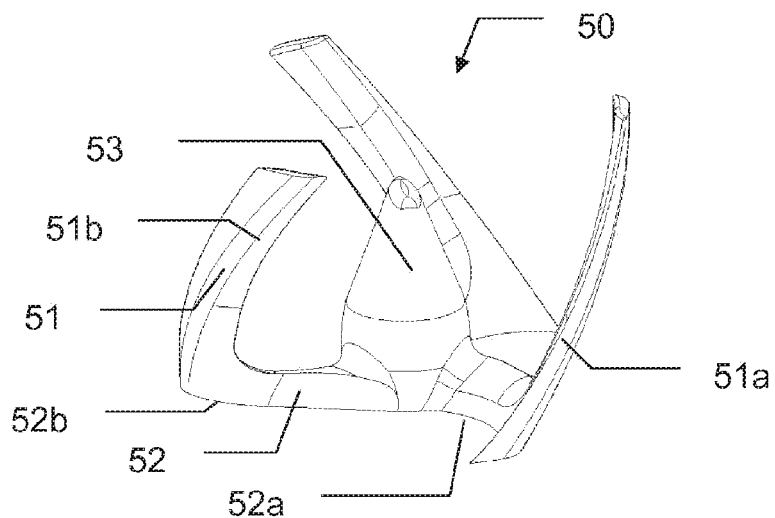
FIG. 3 is a perspective view of a mobile part arranged to form mixing means and dispensing means of the apparatus in FIG. 1 or 2
Figure 4:
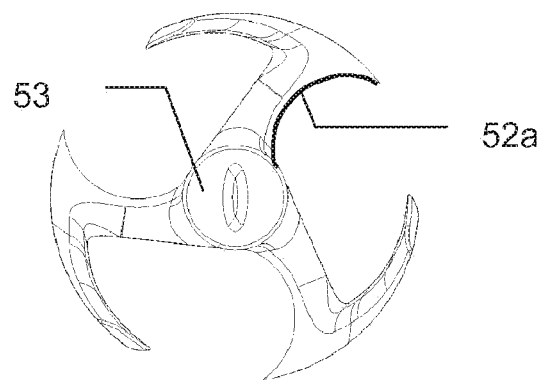
FIG. 4 is a top view of the mobile part in FIG. 3.
Figure 5:
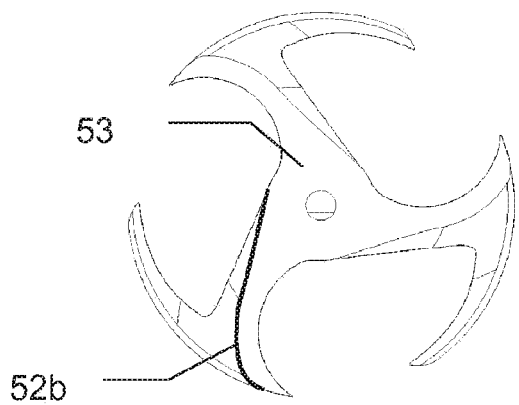
FIG. 5 is a bottom view of the mobile part in FIG. 3.

It is also anticipated to have means for dosing and transferring a first predetermined amount of said at least one liquid to the mixing chamber in the form of a pump (not shown), mixing means, arranged at least temporarily in the mixing chamber, for stirring and mixing said at least one liquid with said at least one dehydrated feed during a mixing phase, so as to form a feed ration in paste form, in the form of a mobile part 50 seen in FIGS. 3 to 5; and dispensing means, arranged to dispense the feed ration in paste form from the mixing chamber into a container, also in the form of the mobile part 50.

The hopper 20 is thus arranged to contain a dehydrated feed in flake, powder, or granulated form, to be mixed inside the mixing chamber 30 with the water initially contained in the container 10. For this purpose, the apparatus thus comprises a pump arranged to pump water from the container 10 and transport it to the mixing chamber. The worm screw 40 is provided to tap the dehydrated feed in the hopper 20, and make it drop into the mixing chamber.

In order to prepare a homogeneous feed ration, it is also anticipated to dose the volume of water as well as the volume of dehydrated feed. For the water, one can then envision using a volumetric pump, or a pump for which the water flow is known, to make it operate during a defined pumping period. For the dehydrated feed, the worm screw is actuated during a defined dosing period. Thus, a first amount of water is poured into the mixing chamber 30, as well as a second quantity of dehydrated feed. It is understood that the first amount of liquid is proportional to the second amount of dehydrated feed, to adhere to a predetermined dosing which permits obtaining a paste.

Then, a mixture is made inside the mixing chamber 30, in order to form a paste with a consistency sufficient to be able to form an appetizing feed ration for the animal. For this purpose, a mobile part 50 (visible in FIGS. 3 to 5) turns in rotation inside the mixing chamber during a mixing period long enough to obtain a paste without lumps, at least 5 minutes, for example. During the mixture, the mobile part 50 turns in a mixing rotation direction so as to mix the water properly with the dehydrated feed.

Then, the mobile part 50 is driven in rotation in a discharge direction of rotation, opposite to the mixing direction of rotation, in order to direct the prepared paste toward the outside wall of the mixing chamber, where a dispensing opening is arranged, and thus to push or extrude the paste through this dispensing opening, in order to make the paste fall into the container 60.

In other words, the mobile part 50 turns in one direction to mix the water and the dehydrated feed, and after a certain amount of time, its drive motor stops and changes direction of rotation to dispense the paste outside the mixing chamber 30. This particularity limits the complexity of the apparatus, as well as its manufacturing cost.

In addition, the mixing chamber comprises a dispensing opening, which is closed during the mixing phase, and which is open during the dispensing phase. Consequently, the mobile part 50 is arranged to direct the paste toward the dispensing opening during the dispensing phase.

Then, the animal for whom the feed ration is intended can eat it directly in the container 60 placed on the apparatus, or the user can take the container 60 and give it to the animal in an appropriate location. In other words, the container 60 can be a part of the apparatus, and it can be removable to permit the animal to eat somewhere other than close to the apparatus, or so that several containers 60 can be filled if the user has several animals to feed. Of course, one could provide a sensor to sense the presence of the container 60, so that the paste is not dispensed unless a container 60 is installed on or in the apparatus.

It is also anticipated to have means for storing at least one food additive, in the form of a cartridge 70, to add an additive to the mixing chamber before or during the mixing of water and dehydrated feed. It can also be anticipated to add vitamins, minerals, medications or any other product for the animal's well-being. The cartridge 70 may be a single-dose cartridge used one time only, or a multi-dose cartridge, only a portion of the content of which is added for a feed ration.

Of course, the apparatus comprises a control member to manage the dosing of the additive from the cartridge 70. One could envision having a piston which comprises a flexible cartridge, or a dosing pump, for example.

Figure 2:
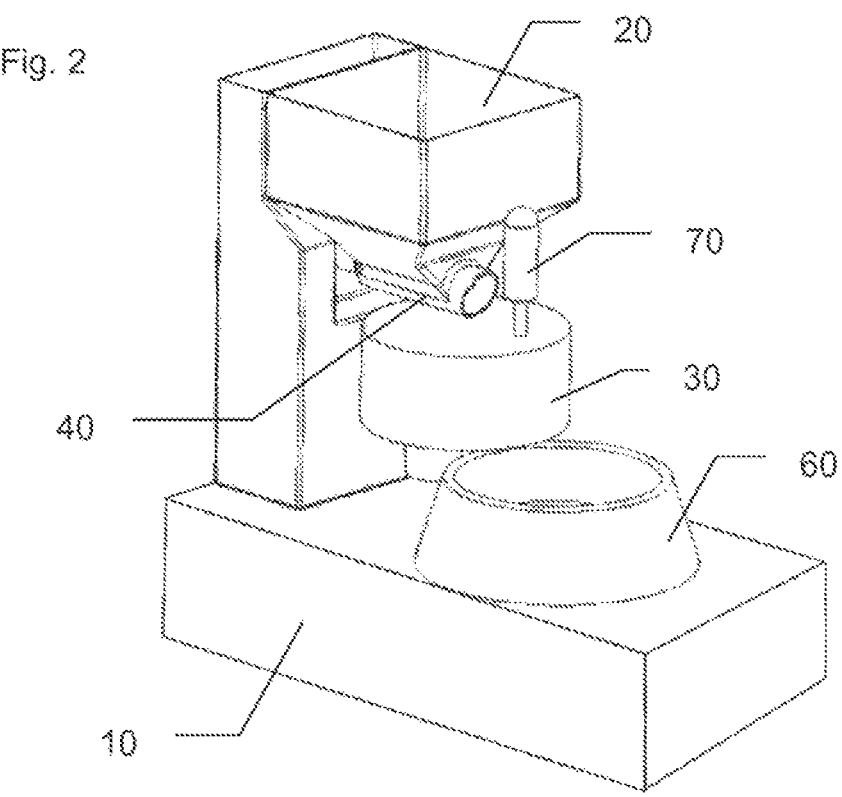
FIG. 2 is a perspective view of a variant of the apparatus in FIG. 1.

FIG. 2 shows an alternative to the apparatus in FIG. 1, where the only difference is in the container 10. In fact, the latter comprises a portion arranged under the apparatus itself, so as to raise the container 60, which improves the animal's comfort because the animal does not have to lower its head to the floor in order to eat.

In addition, the water contained in the container 10 in this implementation ensures stability in the form of a base whose weight is that of the water stored in the container.

FIG. 3 is a perspective view of the mobile part 50. The latter comprises a hub 53 in the central part, and three paddles 51, each of them connected to the hub 53 by a branch 52.

FIG. 4 shows the mobile part 50 seen from the top, and FIG. 5 shows the mobile part 50 seen from the bottom.

As explained above, the mobile part 50 may be driven in rotation in a mixing rotation movement to mix the water and the dehydrated feed. This mixing rotation movement is the clockwise direction on FIG. 4 (and thus counterclockwise on FIG. 5).

The mobile part may also be driven in rotation in a discharge rotation movement, to force the paste to come out of the mixing chamber 30. This discharge rotation movement is the clockwise direction on FIG. 5 (and thus counterclockwise on FIG. 4).

Consequently, the paddles 51 and the branches 52 are asymmetrical, to perform a different function depending on the direction of rotation. For this purpose, each paddle 51 comprises a first leading edge 51a which is arranged to mix the paste during a clockwise rotation (with respect to FIG. 4), and also to return the mixture to the inside of the mixing chamber 30. To perform this function, the first leading edge 51a of each paddle 51 forms a blade whose outer face is tangent to the movement of rotation (it is circular), and the inner face is tilted or oriented to direct the mixture toward the inside of the mixing chamber 30.

At the branches 52, the latter comprise a first front face 52a which scrapes the mixing chamber 30 and forms a point with the blade that it connects to the hub 53. This point is combined with the first leading edge 51a of the paddle to return the mixture to the inside of the mixing chamber 30. Thus, the mixing phase is efficient FIG. 4 shows, in bold, the first front face 52a, in the form of a crescent or point, of the branch 52 situated at about one o'clock in the clockwise direction.

Concerning the discharge movement, the paddles 51 comprise a second leading edge 51b, which is arranged to discharge the paste toward the outside of the mixing chamber 30 during a counterclockwise rotation movement (with respect to FIG. 4). The outer face of each paddle 51 is thus a blade beveled toward the outside, to guide the paste toward the wall of the mixing chamber 30.

In addition, the branches 52 each comprise a second front face 52b, arranged to scrape the mixing chamber 30, and in particular to guide the mixture toward the periphery of the mixing chamber 30, with a rounded trailing edge with the corresponding paddle. FIG. 5 shows, in bold, the second front face 52b for the branch situated at about six o'clock in the clockwise direction.

It will be understood that various modifications and/or improvements obvious to the person skilled in the art may be made to various embodiments of the invention described in this description without departing from the context of the invention defined by the attached claims.

The invention claimed is:

1. An apparatus for preparing feed for animals, which comprises:
   a first container for storing at least one liquid;
   a second container for storing at least one dehydrated feed, the second container disposed adjacent to the first container and having an opening defined at a bottom of the second container;
   a mixing chamber, a first dosing system configured to dose and transfer a first predetermined amount of said at least one liquid to the mixing chamber;

a second dosing system configured to dose and transfer a second predetermined amount of said at least one dehydrated feed to the mixing chamber, the second dosing system disposed underneath the second container in communication with the opening;

a mixer, arranged at least temporarily in the mixing chamber for stirring and mixing said at least one liquid with said at least one dehydrated feed during a mixing phase, so as to form a feed ration in paste form, and a dispenser, arranged to dispense the feed ration in paste form from the mixing chamber into a container during a dispensing phase, wherein the mixing chamber is disposed below the second dosing system, and wherein the dispenser is disposed below the mixing chamber.

2. The apparatus for preparing feed for animals according to claim 1, comprising at least one part that is mobile in relation to the mixing chamber and arranged to be driven in a mixing movement during the feed ration mixing phase, in order to be used as the mixer, and arranged to be driven in a discharge movement during the dispensing phase, in order to be used as the dispenser, and in which at least one component of the discharge movement is in the opposite direction of a component of the mixing movement.

3. The apparatus for preparing feed for animals according to claim 1, comprising at least one mobile part to be in rotation in relation to the mixing chamber and arranged to be driven in rotation in a mixing movement during the feed ration mixing phase in order to be used as the mixer, and wherein said at least one part is arranged to be driven in rotation in a discharge movement in the opposite direction of the mixing movement, during the feed ration dispensing phase, in order to be used as the dispenser.

4. The apparatus for preparing feed for animals according to claim 2, wherein said at least one mobile part comprises a hub, at least one paddle and at least one branch connecting said at least one paddle to the hub, wherein said at least one paddle comprises at least:
a first leading edge arranged to mix said at least one liquid with said at least one dehydrated feed during the mixing movement, and
a second leading edge arranged to push the paste toward the periphery of the mobile part during the discharge movement.

5. The apparatus for preparing feed for animals according to claim 4, wherein said at least one branch comprises at least:
a first front face arranged to scrape the mixing chamber during the mixing movement and forming a point at a junction with said at least one paddle, and a second front face arranged to scrape the mixing chamber during the discharge movement and forming a rounded trailing edge at a junction with said at least one paddle.

6. The apparatus for preparing feed for animals according to claim 2, comprising a device for opening a dispensing opening of the mixing chamber and in which a mechanism for unlocking the opening device is provided, controlled by said at least one part or a drive member of the at least one part, when the at least one part is put into discharge movement.

7. The apparatus for preparing feed for animals according to claim 1, further comprising a third container for storing at least one feed additive, and another dispenser for dispensing in the mixing chamber a third predetermined amount of said at least one feed additive.

8. The apparatus for preparing feed for animals according to claim 1, wherein the second dosing system configured to dose and transfer the second predetermined amount of said at least one dehydrated feed comprise at least one worm screw coupled to a motor.

9. The apparatus for preparing feed for animals according to claim 1, further comprising at least one unit for acquisition of biological and/or physiological data on an animal to be fed.

10. The apparatus for preparing feed for animals according to claim 8, further comprising at least one control unit arranged to control the first dosing system configured to dose and transfer the first predetermined amount of said at least one liquid, and/or the second dosing system configured to dose and transfer the second amount of said at least one dehydrated feed, according to the animal's biological and/or physiological data.

11. The apparatus for preparing feed for animals according to claim 1, wherein the first container of said at least one liquid form a base arranged to support the apparatus for preparing feed for animals and the container in which the feed ration is dispensed.

12. The apparatus for preparing feed for animals according to claim 11, wherein the first dosing system configured to dose and transfer the first predetermined amount of said at least one liquid to the mixing chamber is configured to leave at least a third predetermined volume of liquid in the first container.

13. The apparatus for preparing feed for animals according to claim 1, wherein the first dosing system is in the form of a dosing pump.

14. The apparatus for preparing feed for animals according to claim 1, wherein the first dosing system includes a nozzle for suction of the at least one liquid.

15. The apparatus for preparing feed for animals according to claim 7, wherein the third container is a cartridge that stores the at least one feed additive.

16. The apparatus for preparing feed for animals according to claim 15, wherein the cartridge is a single-dose cartridge.

* * * * *